May 23, 1950      B. J. LEACH      2,509,067
BOAT TRAILER
Filed Nov. 22, 1947      3 Sheets-Sheet 1
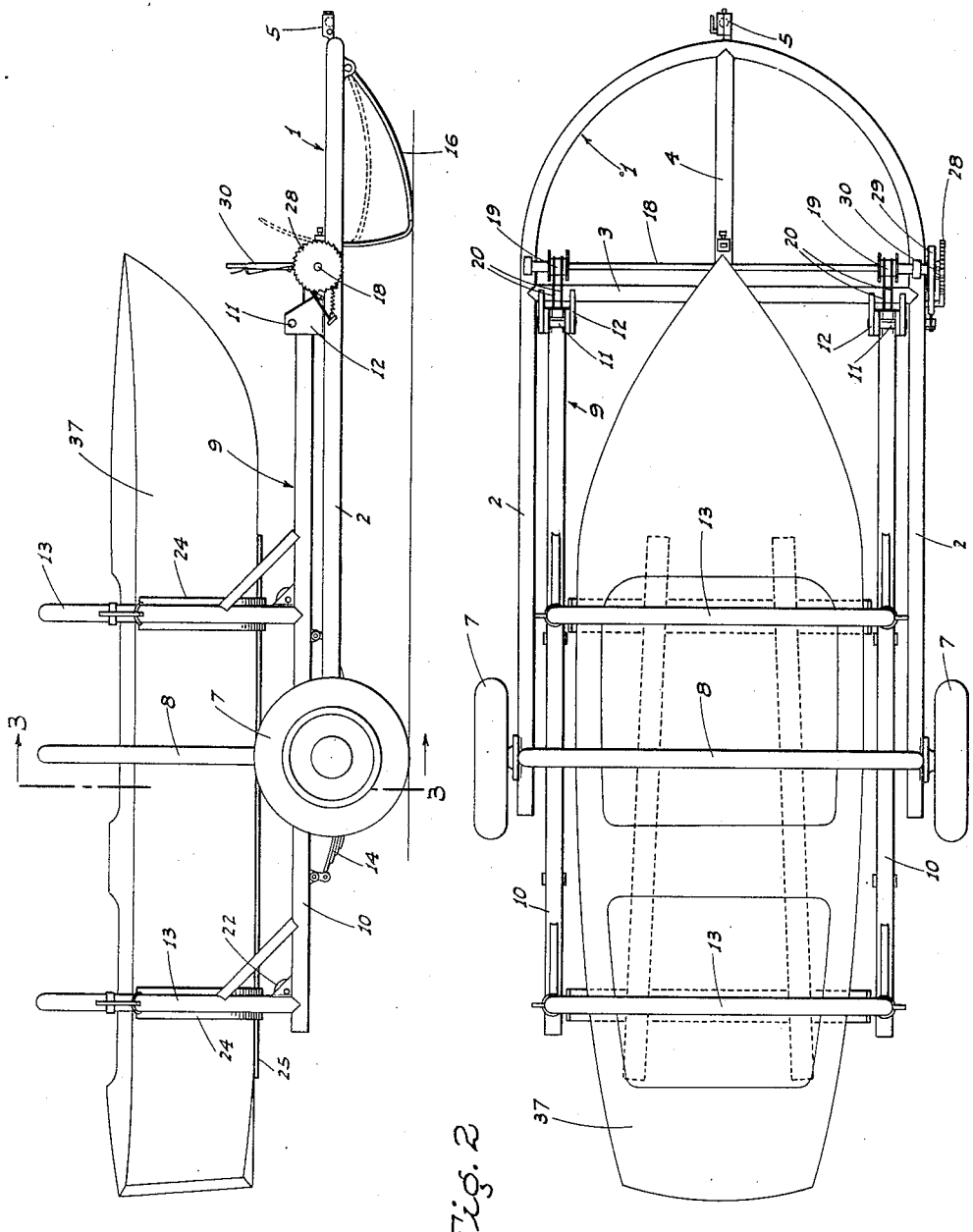
INVENTOR
*Barton J. Leach*
BY *Webster & Webster*
ATTORNEYS May 23, 1950     B. J. LEACH     2,509,067
BOAT TRAILER
Filed Nov. 22, 1947     3 Sheets-Sheet 2
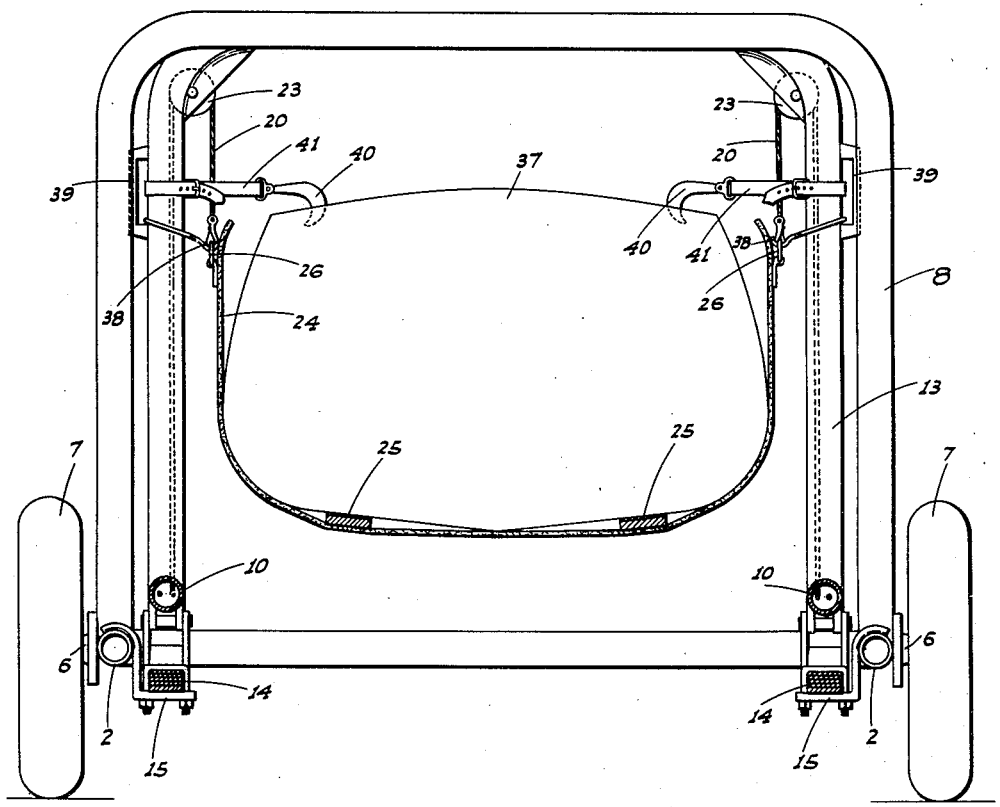
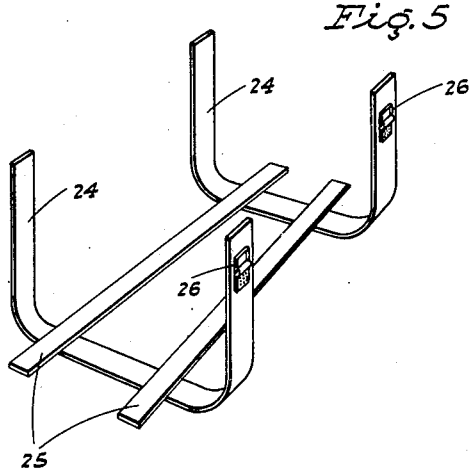
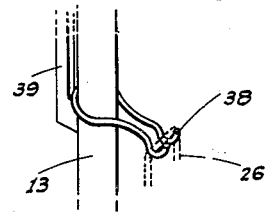
INVENTOR.
Barton J. Leach
BY
ATTYS May 23, 1950     B. J. LEACH     2,509,067
BOAT TRAILER
Filed Nov. 22, 1947     3 Sheets-Sheet 3
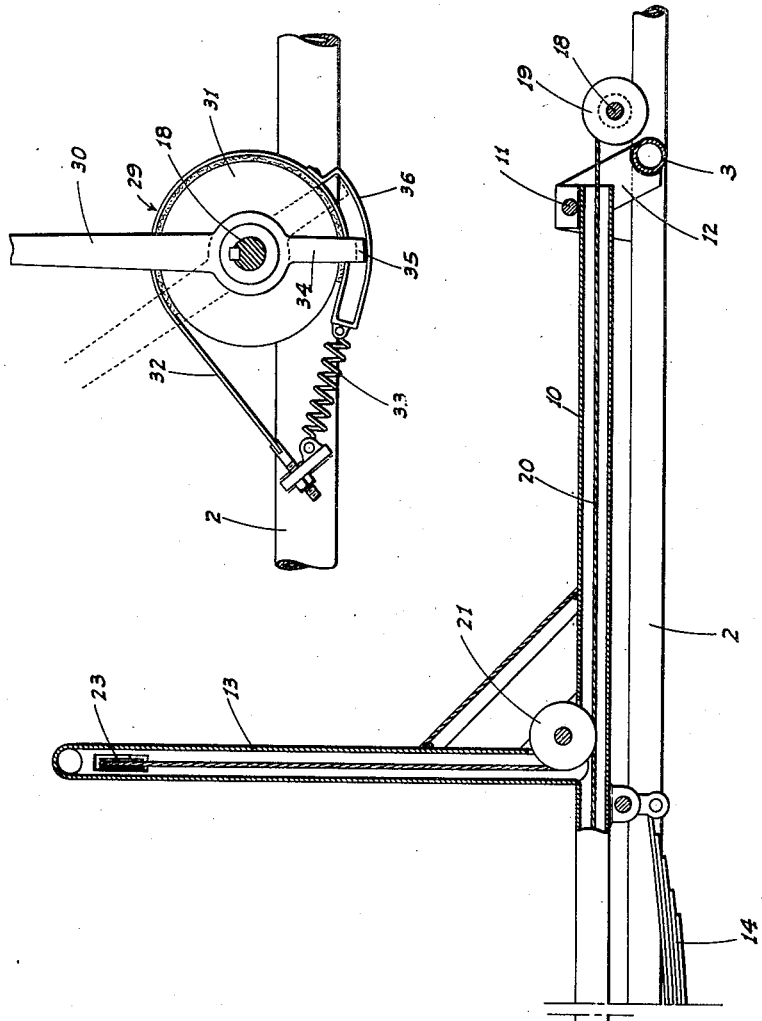
INVENTOR.
Barton J. Leach
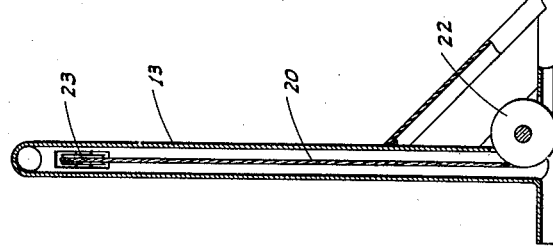
ATTYS Patented May 23, 1950

2,509,067

UNITED STATES PATENT OFFICE 2,509,067

BOAT TRAILER

Barton J. Leach, Live Oak, Calif.

Application November 22, 1947, Serial No. 787,489

6 Claims. (Cl. 214—65)

This invention relates to, and it is an object to provide, an improved boat trailer especially designed for loading, transporting, and launching inboard type pleasure or fishing craft, particularly sport runabouts.

Another object of the invention is to provide a boat trailer by means of which relatively heavy boats may be quickly and easily loaded or launched, and transported from place to place without difficulty.

A further object of the invention is to provide a boat trailer constructed sturdily but relatively lightweight so that it can be trailed readily behind an automobile.

An additional object of the invention is to provide a boat trailer which includes, in novel assembly, a main, wheel supported frame, and a secondary boat supporting frame spring mounted on the main frame whereby road shock to the boat is minimized by the floating action of said secondary frame.

It is also an object to incorporate a novel winch and brake assembly in the boat trailer for the purpose of lifting the boat to transport position, and controlling lowering of the boat for launching.

A further object of the invention is to provide a practical boat trailer, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the boat trailer with a boat therein in transport position.

Fig. 2 is a plan view of the same.

Fig. 3 is an enlarged cross section on line 3—3 of Fig. 1.

Fig. 4 is an enlarged fragmentary sectional elevation showing mainly the secondary frame, and the manner of reeving the lift cables therein.

Fig. 5 is a perspective view of the boat sling unit, detached.

Fig. 6 is a fragmentary perspective view of one of the ring hooks as in use.

Fig. 7 is an enlarged fragmentary elevation of the brake unit.

Referring now more particularly to the characters of reference on the drawings, the improved boat trailer comprises a main frame, indicated generally at 1, which frame is of yoke or U-shape, and is disposed substantially horizontal in rearwardly opening relation. The main frame 1 includes side beams 2, a cross beam 3 connecting said side beams 2 adjacent their forward ends, and a central, longitudinally extending tongue 4 which connects between the cross beam 3, intermediate its ends, and the front end of said main frame; the latter being fitted at said front end with a hitch 5 adapted for connection with an automobile at the rear.

At their rear ends the side beams 2 are fitted with rigid, laterally outwardly projecting spindles 6 on which pneumatic-tired wheels 7 are mounted; there being a rigid arch 8 connecting between the side beams 2 in substantially the transverse vertical plane of the spindles 6.

The above described main frame 1 provides the support for a secondary or floating frame, indicated generally at 9, comprising a pair of substantially horizontal, longitudinally extending side beams 10 disposed in transversely spaced relation above and slightly inwardly of the side beams 2, in parallel relation to the latter. The side beams 10 are pivotally attached, at their forward ends, as at 11, to bracket ears 12 which upstand from the cross beam 3. The side beams 10 of the secondary frame 9 extend rearwardly some distance beyond the rear end of the main frame, and said secondary frame 9 is fitted with rigid upstanding arches 13 disposed ahead and to the rear of the main frame arch 8. For lightness, as well as strength, the main portions of the main frame 1 and secondary frame 9 are of tubular construction, and the pivots 11 which connect with the bracket ears 12 are disposed so that the forward ends of the tubular side beams 10 are open and exposed for the reason hereinafter described.

The secondary frame 9 is spring supported laterally inwardly of the wheels 7 by means of semi-elliptical spring units 14 affixed, at opposite ends, to the side beams 10, and supported between the ends by brackets 15 fixed on the side beams 2 of the main frame.

In the above manner the secondary frame 9 is spring-supported; i. e. it may float vertically whereby transmission of road shock from the wheels 7 to said secondary frame is minimized.

A vertically adjustable, ground engaging shoe 16 is hingedly mounted on the forward end of the main frame 1, and is adapted for adjustment between a lowered, frame-supporting position, as in full lines in Fig. 1, to a raised inoperative position as in dotted lines in said figure. The shoe 16 is maintained in any selected position of adjustment by a spring bolt 17. This shoe serves to support the forward end of the frame when, the trailer is not coupled to an automobile, and may also be used as a drag brake when the trailer is being moved down a sloping bank for launching of the boat.

The main frame 1 is fitted directly ahead of the cross beam 3 with a cross shaft 18 having cable drums 19 fixed thereon directly ahead of the open front ends of the side beams 10 of the secondary frame 9. A pair of lift cables 20 lead from each drum into the adjacent tubular side beam 10. One of said lift cables 20, of the pair in each side beam 10, passes about a direction changing sheave 21 and enters the adjacent leg of the forward arch 13, while the other lift cable 20 extends rearwardly and passes about a direction changing sheave 22 into the corresponding leg of the rear arch 13. Adjacent the upper ends of said arches 13 the cables pass out of said legs in guided relation over top sheaves 23 and thence depend therefrom.

A boat sling unit, as shown detached in Fig. 5, is suspended from the dependent portions of the cables 20 below the top sheaves 23, and such boat sling unit comprises the following:

A pair of sling belts 24, of reinforced rubber or the like, are disposed transversely of the trailer with the end portions upturned; said sling belts being connected together in spaced relation lengthwise of the trailer by padded bottom stays 25. The sling belts 24 are fitted, adjacent but short of opposite ends, and on the outside, with attachment rings 26 adapted to releasably connect with spring snaps 27 on the adjacent ends of the dependent portions of the cables 20; each such cable portion thus being connected to a corresponding end of the adjacent sling belt.

At one end of the cross shaft 18 the latter is connected with a winch and brake assembly which includes a pawl and ratchet type winch unit 28 and a normally set but releasable brake unit 29. The pawl and ratchet type winch unit 28 includes a hand actuated lever 30 adapted to operate said winch unit in a direction to wind the lift cables 20 onto the cable drums; the brake unit 29 normally preventing unwinding of cable from the drums 19. It will be seen that upon actuation of the lever 30 through a given stroke, with resultant winding of the lift cables 20 on the drums 10, that the boat sling unit will be raised in the secondary frame 9. The brake unit 29 includes a brake drum 31 on the cross shaft 18, and a spring set brake band 32 including a spring 33 normally prevents rotation of the drum 31 and consequently the shaft 18. The spring set brake band 32 is releasable as follows:

The lever 30 is formed, at its lower end, with a radial extension 34 having a lateral foot 35 thereon which rides in a concentrically slotted member 36 formed as part of the brake band. When the lever 30 is actuated to operate the winch the stroke is such that the foot 35 merely travels in the slotted member 36 in the manner of a lost motion connection. However, to release the brake the operator frees the pawl of the pawl and ratchet type winch unit 28 and then swings the lever 30 in a direction to engage the lateral foot 35 against the forward end of the slotted member 36, as shown in dotted lines in Fig. 6. Further motion of the lever 30 in such direction relieves the tension of the brake band 32, permitting of rotation of the brake drum 31, whereby the lift cables 20 may then pay off the cable drums 19.

When the above described boat trailer is in use, a boat is loaded therein in the following manner:

The trailer is first backed into the water a short distance, and the brake unit 29 is then released so as to permit the boat sling unit to lower into the water, whereupon the boat 37 is floated, bow first, into said sling over the padded stays 25 thereof, and substantially centered in said sling.

The next step is to operate the pawl and ratchet type winch unit 28 so as to cause lifting of the boat sling, with the boat 37 therein, out of the water upwardly to the transport position as shown in Fig. 1.

With the boat in such position four ring hooks 38, which surround the legs of the secondary frame arches 13, are engaged with the attachment rings 26 on the sling belts 24; the hooks 38 being maintained against downward displacement by slotted plates 39 on said arches and through which slots said hooks 38 are engaged, as shown clearly in Fig. 6. With the hooks 38 engaged with the rings 26 the tension may be relieved from the cables 20 during transport of the boat in the boat trailer.

In order to prevent lateral swinging of the boat as suspended in the secondary frame 9, there is provided a plurality of rubber covered stabilizer hooks 40 which engage over the gunwales of the boat adjacent corresponding arches 13; said stabilizer hooks 40 being attached to adjacent straps 41 which extend about the legs of said arches and through the slotted plates 39.

To launch the boat from the trailer, the above described operation is reversed, with the exception that instead of operation of the pawl and ratchet type winch unit 28, the normally set brake unit 29 is gently released to permit the boat sling unit, with the boat therein, to lower into the water.

It is important to note that in the loading, transporting, or launching, of the motorboat, it is lifted, held, or lowered by means of the boat sling, and by such means the pressure on the hull has even distribution. The padded stays, and the belts of the sling, not only give well adjusted support for the boat, but will not scrape or mar the finish of a fine pleasure craft.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A motorboat trailer comprising a main, wheel-supported frame adapted to connect to an automobile in trailing relation, a secondary frame extending lengthwise of the main frame, means pivoting the secondary frame at its forward end on the main frame for vertical floating movement, spring means supporting the secondary frame rearwardly of its pivotal axis and from the main frame, both frames being open at the rear end, the secondary frame having a pair of rigid arches extending from side to side of said frame in spaced relation lengthwise thereof, and means arranged to suspend a motorboat from said pair of arches, with the latter straddling said motorboat; said suspension means including a transversely spaced pair of cables depending from each arch, a boat sling unit attached to said cables, there being a winch unit on the trailer operatively connected to said cables, the secondary frame including side beams, the side beams and arches being of tubular construction, said cables including portions running within the legs of the arches and the corresponding side beams, the winch unit including drums beyond the forward ends of the side beams, said cable portions leading out of the side beams to connection with the drums.

2. In a wheel-supported motorboat trailer adapted to connect to an automobile in trailing relation, a longitudinal frame open at the rear, said frame including a longitudinally spaced pair of rigid arches, a boat sling unit within said frame, and means vertically adjustably suspending the boat sling unit from the arches; said boat sling unit comprising a pair of transversely extending, flexible belts disposed in spaced relation, stay means connecting said belts to maintain them spaced, and connection rings on the belts adjacent the ends thereof and on the outside when the end portions of said belts are turned upwardly.

3. A motor boat trailer as in claim 2 in which said suspending means includes cabes depending from the arches, and spring snaps on the cables adapted to releasably connect with corresponding ones of said rings.

4. A motorboat trailer comprising a main, wheel-supported frame adapted to connect to an automobile in trailing relation, said main frame being open at the rear and including transversely spaced side beams, a secondary frame open at the rear and including transversely spaced side beams, said secondary frame being vertically swingably pivoted at its forward end on the main frame and extending lengthwise of the latter, spring units supporting the secondary frame from the main frame rearwardly of the pivotal axis of said secondary frame, means operative to suspend a motorboat from the secondary frame; the secondary frame including a pair of rigid arches extending between the side beams, and said suspension means being lift cables depending from the arches, the side beams of the secondary frame being tubular and open at their forward ends, a winch unit having cable drums adjacent said open ends, the cables leading through said tubular side beams and out of the open ends thereof to a connection with the cable drums.

5. A boat carrying trailer comprising a substantially rectangular main frame open at its rear end, wheels supporting the main frame adjacent its rear end, means for attaching the front end of the main frame to a motor vehicle, an upstanding arch member connecting the sides of the main frame adjacent the open end thereof, a secondary substantially rectangular frame open at its rear end, the forward end of the secondary frame being pivotally mounted on the main frame adjacent the front end of the latter and such secondary frame being narrower than the main frame whereby such secondary frame may swing on its pivotal point between the sides of the main frame, spring members connecting the secondary frame to the main frame adjacent its rear end, spaced apart upstanding arch members connecting the sides of the secondary frame, a boat sling mechanism carried by said last named arch members, and means for operating said sling mechanism.

6. A device as in claim 5 in which the rear end of the secondary frame projects beyond the rear end of the main frame, the spring members being connected to the main frame adjacent the central axes of the wheels on the main frame.

BARTON J. LEACH.

REFERENCES CITED

The following references are of record in the file of this patent:

UNITED STATES PATENTS

| Number | Name | Date |
|---|---|---|
| 1,265,705 | Litchfield | May 7, 1918 |
| 2,296,611 | Green | Sept. 22, 1942 |
| 2,321,198 | Graves | June 8, 1943 |
| 2,415,771 | Agtmael | Feb. 11, 1947 |
| 2,442,994 | Clary | June 8, 1948 |
| 2,448,119 | Peterson | Aug. 31, 1948 |
| 2,452,938 | Krake | Nov. 2, 1948 |

FOREIGN PATENTS

| Number | Country | Date |
|---|---|---|
| 239,774 | Great Britain | Sept. 17, 1925 |
| 470,114 | Great Britain | Aug. 10, 1937 |